US012352410B2

(12) United States Patent
Jurik et al.

(10) Patent No.: US 12,352,410 B2
(45) Date of Patent: Jul. 8, 2025

(54) COATING FOR A FRAMING SHUTTER FOR A LUMINAIRE

(71) Applicant: ROBE lighting s.r.o., Roznov pod Radhostem (CZ)

(72) Inventors: Pavel Jurik, Prostredni Becva (CZ); Josef Valchar, Prostredni Becva (CZ)

(73) Assignee: ROBE lighting s.r.o., Roznov pod Radhostem (CZ)

( * ) Notice: Subject to any disclaimer, the term of this patent is extended or adjusted under 35 U.S.C. 154(b) by 0 days.

(21) Appl. No.: 18/945,094

(22) Filed: Nov. 12, 2024

(65) Prior Publication Data

US 2025/0067419 A1 Feb. 27, 2025

Related U.S. Application Data

(60) Provisional application No. 63/602,944, filed on Nov. 27, 2023.

(51) Int. Cl.
*F21V 14/08* (2006.01)
*F21V 11/00* (2015.01)
(Continued)

(52) U.S. Cl.
CPC .............. *F21V 14/08* (2013.01); *F21V 11/00* (2013.01); *F21V 11/06* (2013.01); *F21V 11/065* (2013.01);
(Continued)

(58) Field of Classification Search
CPC ................................................ F21W 2131/406
See application file for complete search history.

(56) References Cited

U.S. PATENT DOCUMENTS 4,458,303 A 7/1984 Berns
5,251,110 A 10/1993 Leleve
(Continued)

FOREIGN PATENT DOCUMENTS

CN 202097305 U * 1/2012
CN 203375252 U 1/2014
(Continued)

OTHER PUBLICATIONS

Machine translation of JP 2005022043 A retrieved from the FIT database of PE2E search. (Year: 2025).*
Machine translation of CN 202097305 U retrieved from the FIT database of PE2E search. (Year: 2025).*
European Extended Search Report; Application No. 24213139.9; Apr. 16, 2025; 7 pages.

*Primary Examiner* — Colin J Cattanach
(74) *Attorney, Agent, or Firm* — Conley Rose, P.C.; Brooks W Taylor

(57) ABSTRACT

A luminaire includes a light source and a framing shutter system. The light source is configured to emit a light beam. The framing shutter system includes an aperture that is configured to receive the light beam. The framing shutter system further includes a plurality of shutter blades configured to be positioned across the aperture and mask a portion of the light beam. Each of the shutter blades includes a blade substrate material having a front surface that is configured to receive the light beam and a rear surface on an opposite side of the blade substrate material from the front surface. The front surface of each shutter blade includes a first coating that is configured to reflect one or both of light and heat. The rear surface of each shutter blade may include a second coating configured to reduce reflection of light from the rear surface.

20 Claims, 4 Drawing Sheets

(51) Int. Cl.

| | |
|---|---|
| ***F21V 11/06*** | (2006.01) |
| ***F21V 11/08*** | (2006.01) |
| ***F21V 11/10*** | (2006.01) |
| ***F21V 11/12*** | (2006.01) |
| ***F21V 11/18*** | (2006.01) |
| ***F21W 131/406*** | (2006.01) |

(52) U.S. Cl.
CPC ............... *F21V 11/08* (2013.01); *F21V 11/10* (2013.01); *F21V 11/12* (2013.01); *F21V 11/18* (2013.01); *F21V 11/186* (2013.01); *F21V 14/085* (2013.01); *F21W 2131/406* (2013.01)

(56) References Cited

U.S. PATENT DOCUMENTS

| | | | | |
|---|---|---|---|---|
| 10,018,329 | B1* | 7/2018 | Belliveau | F21V 11/186 |
| 2015/0109797 | A1 | 4/2015 | Jurik et al. | |
| 2015/0300604 | A1* | 10/2015 | Jurik | F21V 11/186 362/281 |

FOREIGN PATENT DOCUMENTS

| | | | |
|---|---|---|---|
| EP | 0854319 | B1 | 6/2000 |
| JP | 2005022043 | A * | 1/2005 |

* cited by examiner

COATING FOR A FRAMING SHUTTER FOR A LUMINAIRE

CROSS-REFERENCE TO RELATED APPLICATIONS

This application claims priority to U.S. Provisional Application No. 63/602,944 filed Nov. 27, 2023 by Pavel Jurik, et al. entitled, "Coating for a Framing Shutter for a Luminaire", which is incorporated by reference herein as if reproduced in its entirety.

TECHNICAL FIELD OF THE DISCLOSURE

The disclosure generally relates to luminaires, and more specifically to a coating for a framing shutter for a luminaire.

BACKGROUND

Some luminaires in the entertainment and architectural lighting markets are manually operated while others include automated and/or remotely controllable functions. Such products may be used in theatres, television studios, concerts, theme parks, night clubs and other venues. An optical system of such a luminaire may include a gate or aperture through which a light beam is constrained to pass. Mounted in or near this gate may be devices such as gobos, patterns, irises, color filters or other beam modifying devices. The use of a framing shutter system at the gate allows control over a size and shape of the luminaire's output beam and thus the size and shape of the image projected onto a surface.

BRIEF DESCRIPTION OF THE DRAWINGS

For a more complete understanding of the present disclosure and the advantages thereof, reference is now made to the following description taken in conjunction with the accompanying drawings in which like reference numerals indicate like features and wherein.

SUMMARY

Figure 1:
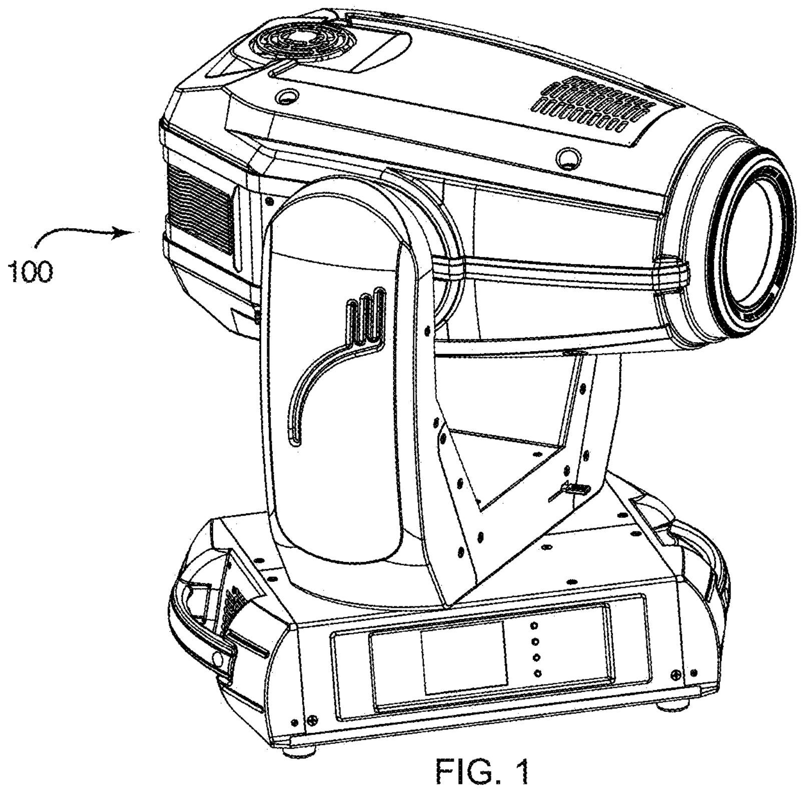
FIG. 1 presents an isometric view of a luminaire according to the disclosure.

In a first embodiment, a framing shutter system includes a plurality of shutter blades. Each of the shutter blades includes a blade substrate material having a front surface that is configured to receive a light beam and a rear surface on an opposite side of the blade substrate material from the front surface. The front surface of each shutter blade includes a first coating configured to reflect one or both of light and heat.

In a second embodiment, a luminaire includes a light source and a framing shutter system. The light source is configured to emit a light beam. The framing shutter system includes an aperture that is configured to receive the light beam. The framing shutter system further includes a plurality of shutter blades configured to be positioned across the aperture and mask a portion of the light beam. Each of the shutter blades includes a blade substrate material having a front surface that is configured to receive the light beam and a rear surface on an opposite side of the blade substrate material from the front surface. The front surface of each shutter blade includes a first coating that is configured to reflect one or both of light and heat.

DETAILED DESCRIPTION

Preferred embodiments are illustrated in the figures, like numerals being used to refer to like and corresponding parts of the various drawings.

A framing shutter may include four or more blades that may be inserted to a desired position across the beam and rotated as desired. Such framing shutter blades mask the light in parts of the beam and, in doing so, absorb energy from the light. Consequently, the blades receive light energy from a light source of the luminaire on one side of the blade. This light energy heats up the blade and may, over time, cause problems such as: (a) degradation of the blade due to oxidation of the blade material; (b) damage to the surface of the blade, such as scratches and abrasion; and (c) warping of the blade due to heating. Blackening of the blade material due to oxidation may exacerbate such issues by causing greater absorption of light energy. To counteract such problems, some framing shutter blades are manufactured from a heat resistant metal such as tungsten, molybdenum, or related alloys. However, even such materials may suffer damage from the light energy. Framing shutter blades of various materials may also be damaged over time by scratches and abrasion from contact with other shutter blades and other elements of a framing shutter mechanism.

Some luminaires (both automated and non-automated) comprise a light source including a discharge lamp, a light emitting diode (LED) array, or a laser based light source, where a laser LED is used as a pump for a light emitting phosphor. Luminaires may comprise a variety of optical systems, including a framing shutter system that provides shaping of the light beam. With high power light sources, blades of some framing shutter systems may absorb large amounts of energy from the impinging light beam, which may cause damage to the shutter blades as discussed above. The present disclosure presents methods to mitigate this potential damage.

FIG. 1 presents an isometric view of an automated luminaire 100 that includes a framing shutter system according to the disclosure. In other embodiments, a manually operated luminaire may include a framing shutter system according to the disclosure.

Figure 2:
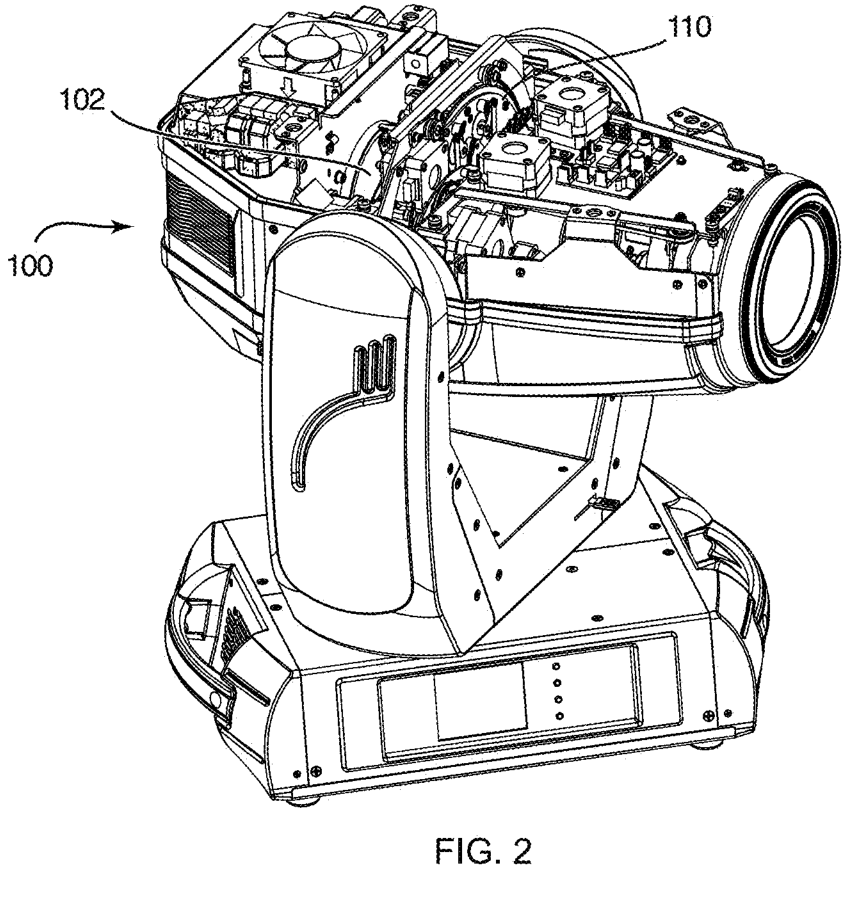
FIG. 2 presents an isometric view of the luminaire of FIG. 1 with an outer cover removed revealing the framing shutter system.

FIG. 2 presents an isometric view of the automated luminaire 100 of FIG. 1, with an outer cover removed to reveal components of the automated luminaire 100. The automated luminaire 100 comprises a light source 102 and a framing shutter system 110. While the framing shutter system 110 is shown as mounted in automated luminaire 100, a fully automated luminaire, in other embodiments, framing shutter systems according to the disclosure may be used with other types of luminaires. Such luminaires include semi-automated luminaires, where functions such as framing shutter, zoom, color are automated but pan and tilt are manually repositionable, as well as fully manual luminaires, where all functions are adjusted at the luminaire by an operator.

Figure 3:
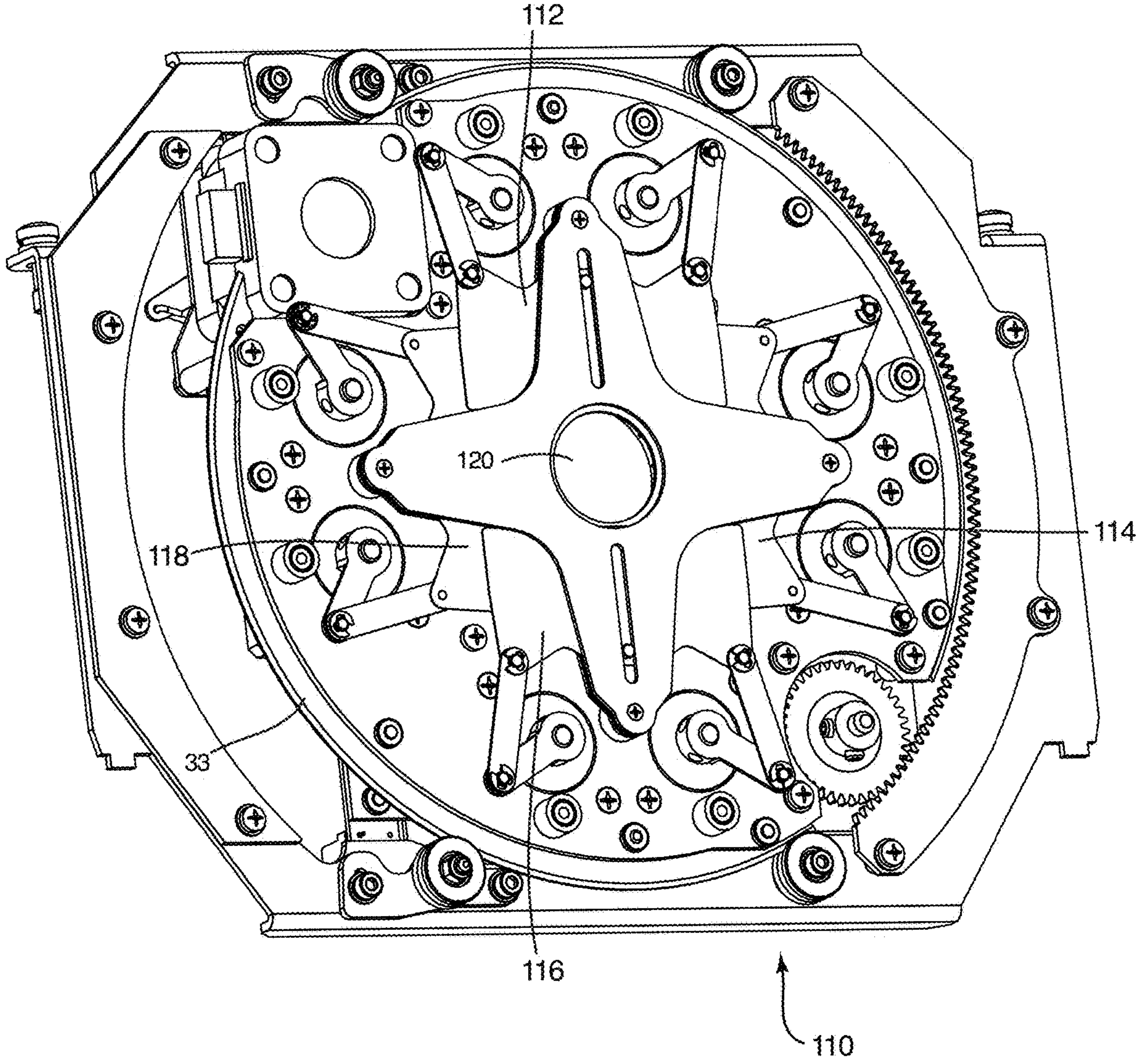
FIG. 3 presents an isometric view of a framing shutter system according to the disclosure in a first configuration.

FIG. 3 presents an isometric view of the framing shutter system 110 of FIG. 2. The framing shutter system 110 includes four shutter blades 112, 114, 116, and 118 each of which may independently be moved across a light aperture 120. In other embodiments, fewer or more than four shutter blades may be used. The shutter blades 112, 114, 116, and 118 are configured to be moved in the framing shutter system 110 by associated motors and mechanisms to which they are mechanically coupled. In other embodiments, the shutter blades 112, 114, 116, and 118 may be moved manually by associated operator-actuated mechanisms to which they are mechanically coupled. When positioned across the light aperture 120 the shutter blades 112, 114, 116, and 118 mask portions of a light beam emitted by the light source 102 and passing through the light aperture 120 and may absorb light energy from the light beam. The absorbed energy causes the shutter blade to heat up. In operation, blade temperatures in excess of 400° C. may be reached.

Figure 4:
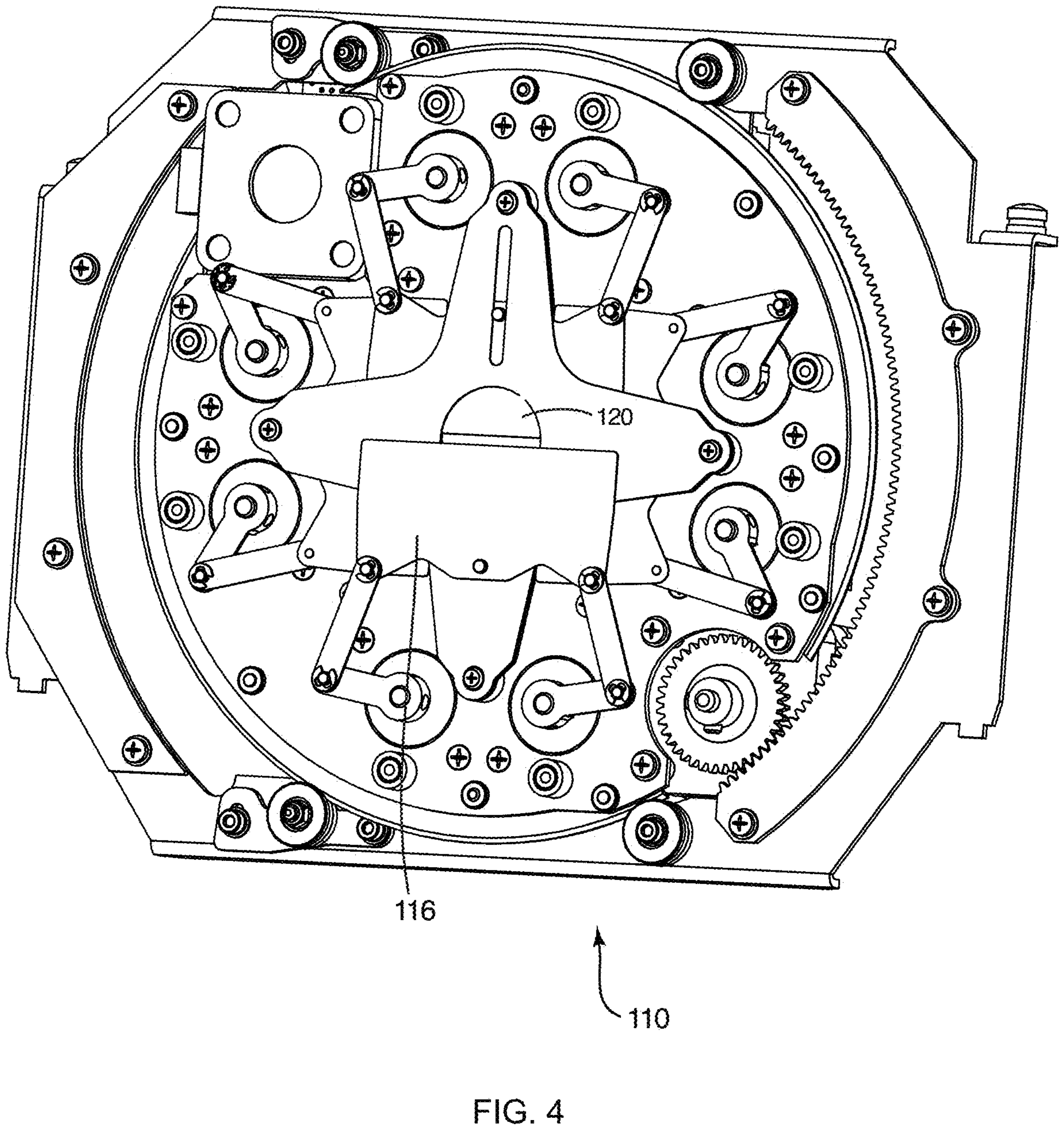
FIG. 4 presents a second isometric view of the framing shutter system of FIG. 3 in a second configuration.

FIG. 4 presents a second isometric view of the framing shutter system 110 of FIG. 3 in a second configuration. Some components have been removed to show the shutter blade 116 positioned to cover a portion of the light aperture 120.

Figure 5:
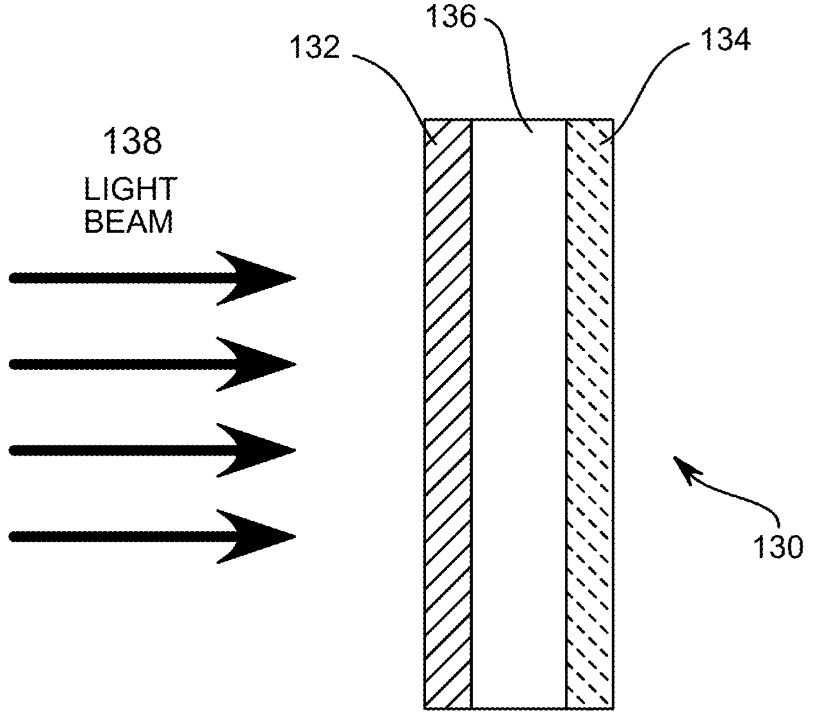
FIG. 5 presents a cross sectional view of a portion of a framing shutter blade according to the disclosure.

FIG. 5 presents a cross sectional view of a portion of a framing shutter blade 130 according to an embodiment of the disclosure. The framing shutter blade 130 comprises a blade substrate material 136 coated on a front surface by a coating layer 132 and on a rear surface by a coating layer 134. In various embodiments, the blade substrate material 136 is a heat resistant metal such as tungsten, molybdenum, associated alloys, or any other metal resistant to high heat. FIG. 5 is not drawn to scale; a thickness of the blade substrate material 136 is much greater than the thicknesses of the coating layers 132 and 134 shown in FIG. 5.

The front surface of the framing shutter blade 130 receives light energy from a light beam 138 and is protected in one or more ways by the coating layer 132. In some embodiments, the coating layer 132 comprises Chromium Nitride. Chromium Nitride is a hard coating that, in some such embodiments, is applied to the framing shutter blade 130 via physical vapor deposition (PVD) to form the protective coating layer 132. In some such embodiments, the film is between 2 and 6 microns in thickness. The coating layer 132 provides technical solutions to one or more of the technical problems relating to light energy that are discussed above: oxidation of the shutter blade material, damage to the surface of the shutter blade, and/or warping of the shutter blade due to heating. The coating layer 132 is configured to provide a surface that reflects light and heat and remains reflective even as the framing shutter blade 130 heats up. In various embodiments, the coating layer 132 is configured also to provide one or more of (a) protection of the blade substrate material 136 from oxidation; (b) a hard material that protects the framing shutter blade 130 against scratches and abrasion; and (c) a self-lubricating surface that facilitates movement of the framing shutter blade 130.

In some embodiments, the coating layer 134 on the rear surface of the blade substrate material 136 may be an aluminum titanium nitride coating. The coating layer 134 is configured to provide an anti-reflective surface, i.e., a surface that reduces internal reflection of light within the automated luminaire 100. In various embodiments, the coating layer 134 is configured also to provide one or more of (a) protection of the blade substrate material 136 from oxidation; (b) a hard material that protects the framing shutter blade 130 against scratches and abrasion; and (c) a self-lubricating surface that facilitates movement of the framing shutter blade 130.

While only some embodiments of the disclosure have been described herein, those skilled in the art, having benefit of this disclosure, will appreciate that other embodiments may be devised which do not depart from the scope of the disclosure herein. While the disclosure has been described in detail, it should be understood that various changes, substitutions, and alterations can be made hereto without departing from the spirit and scope of the disclosure.

What is claimed is:

1. A framing shutter system comprising:

a plurality of shutter blades, wherein each of the shutter blades comprises a blade substrate material having a front surface configured to receive a light beam and a rear surface on an opposite side of the blade substrate material from the front surface, wherein the front surface of each shutter blade comprises a first coating configured to reflect one or both of light and heat and the first coating is more reflective than the front surface of the shutter blade.

2. The framing shutter system of claim 1, wherein the first coating is further configured to (i) protect the blade substrate material from oxidation, (ii) protect against one or both of scratches and abrasion, and (iii) provide a self-lubricating surface.

3. The framing shutter system of claim 2, wherein the first coating comprises chromium nitride.

4. The framing shutter system of claim 3, wherein each of the shutter blades comprises one of tungsten and molybdenum.

5. The framing shutter system of claim 4, wherein the first coating has a thickness between 2 microns and 6 microns.

6. The framing shutter system of claim 4, wherein each of the shutter blades is mechanically coupled to an associated motor and configured to be moved by its associated motor independently of other shutter blades of the plurality of shutter blades.

7. The framing shutter system of claim 4, wherein each of the shutter blades is mechanically coupled to an operator-actuated mechanism and configured to be moved by its associated operator-actuated mechanism independently of other shutter blades of the plurality of shutter blades.

8. The framing shutter system of claim 4, wherein the rear surface of each shutter blade comprises a second coating configured to reduce reflection of light from the rear surface.

9. The framing shutter system of claim 8, wherein the second coating is further configured to (i) protect the blade substrate material from oxidation and (ii) provide a self-lubricating surface.

10. The framing shutter system of claim 9, wherein the second coating comprises aluminum titanium nitride.

11. A luminaire comprising:

a light source configured to emit a light beam; and a framing shutter system comprising an aperture configured to receive the light beam, the framing shutter system further comprising:

a plurality of shutter blades configured to be positioned across the aperture and mask a portion of the light beam, wherein each of the shutter blades comprises a blade substrate material having a front surface configured to receive the light beam and a rear surface on an opposite side of the blade substrate material from the front surface, wherein the front surface of each shutter blade comprises a first coating configured to reflect one or both of light and heat and the first coating is more reflective than the front surface of the shutter blade.

12. The luminaire of claim 11, wherein the first coating is further configured to (i) protect the blade substrate material from oxidation, (ii) protect against one or both of scratches and abrasion, and (iii) provide a self-lubricating surface.

13. The luminaire of claim 12, wherein the first coating comprises chromium nitride.

14. The luminaire of claim 13, wherein each of the shutter blades comprises one of tungsten and molybdenum.

15. The luminaire of claim 14, wherein the first coating has a thickness between 2 microns and 6 microns.

16. The luminaire of claim 14, wherein each of the shutter blades is mechanically coupled to an associated motor and configured to be moved by its associated motor independently of other shutter blades of the plurality of shutter blades.

17. The luminaire of claim 14, wherein each of the shutter blades is mechanically coupled to an operator-actuated mechanism and configured to be moved by its associated operator-actuated mechanism independently of other shutter blades of the plurality of shutter blades.

18. The luminaire of claim 14, wherein the rear surface of each shutter blade comprises a second coating configured to reduce reflection of light from the rear surface.

19. The luminaire of claim 18, wherein the second coating is further configured to (i) protect the blade substrate material from oxidation and (ii) provide a self-lubricating surface.

20. The luminaire of claim 19, wherein the second coating comprises aluminum titanium nitride.

* * * * *